United States Patent [19]
Herdeg et al.

[11] Patent Number: 5,652,869
[45] Date of Patent: *Jul. 29, 1997

[54] SYSTEM FOR EXECUTING AND DEBUGGING MULTIPLE CODES IN A MULTI-ARCHITECTURE ENVIRONMENT USING JACKETING MEANS FOR JACKETING THE CROSS-DOMAIN CALLS

[75] Inventors: Mark A. Herdeg, Leominster, Mass.; James A. Wooldridge, Amherst, N.H.; Scott G. Robinson, Tyngsboro, Mass.; Ronald F. Brender, Hollis, N.H.; Michael V. Iles, Chinebam, England

[73] Assignee: Digital Equipment Corporation, Maynard, Mass.

[ * ] Notice: The portion of the term of this patent subsequent to Aug. 16, 2011, has been disclaimed.

[21] Appl. No.: 365,987

[22] Filed: Dec. 28, 1994

Related U.S. Application Data

[63] Continuation of Ser. No. 264,213, Jun. 17, 1994, abandoned, which is a continuation of Ser. No. 666,039, Mar. 7, 1991, abandoned.

[51] Int. Cl.⁶ .................... G06F 3/00; G06F 9/40
[52] U.S. Cl. .................... 395/500; 395/701; 395/800; 364/941; 364/232.3; 364/DIG. 1
[58] Field of Search .................... 395/800, 500, 395/700, 375, 650

[56] References Cited

U.S. PATENT DOCUMENTS

| | | | |
|---|---|---|---|
| 3,955,180 | 5/1976 | Hirtle | 364/200 |
| 3,997,895 | 12/1976 | Cassonnet et al. | 340/172.5 |
| 4,077,058 | 2/1978 | Appell et al. | 395/650 |
| 4,084,235 | 4/1978 | Hirtle et al. | 364/200 |
| 4,253,145 | 2/1981 | Goldberg | 395/500 |
| 4,297,743 | 10/1981 | Appell et al. | 364/200 |
| 4,347,565 | 8/1982 | Kaneda et al. | 364/200 |
| 4,454,580 | 6/1984 | Page et al. | 395/375 |
| 4,456,954 | 6/1984 | Bullions, III et al. | 364/200 |
| 4,486,831 | 12/1984 | Wheatley et al. | 395/650 |
| 4,509,122 | 4/1985 | Agnew et al. | 395/500 |
| 4,533,996 | 8/1985 | Hartung et al. | 395/275 |

(List continued on next page.)

FOREIGN PATENT DOCUMENTS

| | | |
|---|---|---|
| 0 168 034 | 1/1986 | European Pat. Off. . |
| 0 261 247 | 3/1988 | European Pat. Off. . |
| 358620 | 3/1990 | European Pat. Off. . |
| 0 372 835 | 6/1990 | European Pat. Off. . |
| 387172 | 9/1990 | European Pat. Off. . |
| 0 411 584 A2 | 2/1991 | European Pat. Off. . |
| 62-73333 | 4/1987 | Japan . |
| 90 01738 | 2/1990 | WIPO . |

OTHER PUBLICATIONS

Tanenbaum, A., "Structured Computer Organization," Prentice–Hall, 1984, pp. 327–331 and 380–381.

Weiss, Ray, "Sun Simulator Bows (Sun Microsystems Inc.'s SPARCsim Hardware Simulator)," Electronic Engineering Times, Nov. 7, 1988, summary.

Collett, Ron, "RISC Chips Gain Need Support Tools," ESD: The Electronic System Design Magazine, vol. 19, No. 3, Mar. 1989, summary.

(List continued on next page.)

*Primary Examiner*—Meng-Ai An
*Attorney, Agent, or Firm*—Denis G. Maloney; Arthur W. Fisher

[57] ABSTRACT

A system is provided for executing and debugging multiple codes in a multi-architecture environment that includes a real X architecture (domain) and a simulated (Y) architecture (domain). The multiple code executing and debugging system comprises an X computer system having a memory with stored X and Y code and having the X architecture embodied therein.

A detector is provided to detect calls from executing code in either domain for cross-domain services including execution of cross-domain routines. A jacketing system jackets cross-domain routine calls to interface the calling conventions of the calling and the called routines.

18 Claims, 8 Drawing Sheets

U.S. PATENT DOCUMENTS

| | | | |
|---|---|---|---|
| 4,630,231 | 12/1986 | Hirata et al. | 358/342 |
| 4,672,532 | 6/1987 | JongeVos | 395/600 |
| 4,755,997 | 7/1988 | Takahashi | 395/183.14 |
| 4,792,895 | 12/1988 | Tallman | 395/375 |
| 4,794,522 | 12/1988 | Simpson | 395/500 |
| 4,802,165 | 1/1989 | Ream | 395/183.14 |
| 4,811,345 | 3/1989 | Johnson | 395/183.03 |
| 4,819,234 | 4/1989 | Huber | 395/183.14 |
| 4,839,797 | 6/1989 | Katori et al. | 395/375 |
| 4,841,476 | 6/1989 | Mitchell et al. | 395/500 |
| 4,918,594 | 4/1990 | Onizuka | 395/500 |
| 4,945,480 | 7/1990 | Clark et al. | 395/700 |
| 4,949,255 | 8/1990 | Gerth et al. | 395/700 |
| 4,951,195 | 8/1990 | Fogg, Jr. et al. | 365/500 |
| 4,992,934 | 2/1991 | Portanova et al. | 364/200 |
| 5,029,069 | 7/1991 | Sakamura | 395/375 |
| 5,038,348 | 8/1991 | Yoda et al. | 371/19 |
| 5,051,893 | 9/1991 | Tenny et al. | 395/500 |
| 5,062,039 | 10/1991 | Brown et al. | 395/650 |
| 5,063,499 | 11/1991 | Garber | 395/500 |
| 5,067,072 | 11/1991 | Talati et al. | 395/650 |
| 5,093,917 | 3/1992 | Campbell et al. | 395/700 |
| 5,097,533 | 3/1992 | Burger et al. | 395/500 |
| 5,133,072 | 7/1992 | Buzbee | 395/700 |
| 5,142,622 | 8/1992 | Owens | 395/200 |
| 5,146,593 | 9/1992 | Brandle et al. | 395/700 |
| 5,167,023 | 11/1992 | de Nicolas et al. | 395/500 |
| 5,179,703 | 1/1993 | Evans | 395/700 |
| 5,210,832 | 5/1993 | Maier et al. | 395/375 |
| 5,210,867 | 5/1993 | Uchida | 395/700 |
| 5,210,874 | 5/1993 | Karger | 395/650 |
| 5,218,699 | 6/1993 | Brandle et al. | 395/650 |
| 5,307,504 | 4/1994 | Robinson et al. | 395/800 |
| 5,315,710 | 5/1994 | Kishimoto et al. | 395/700 |
| 5,339,422 | 8/1994 | Brender et al. | 395/700 |

OTHER PUBLICATIONS

Kopetzky, D.J., "HORSE: A Simulation Of The Horizon Supercomputer," IEEE Computer Society Press, Nov. 1988, pp. 53–54.

Markowitz, Michael, "Software–Modeling Capability Allows You To 'Emulate' Your systems Designs (Smart-Model Windows, from Logic Automation Inc.) (Product Update)," EDN, Apr. 13, 1989, vol. 34, No. 8, summary.

Hummel, Robert L., PC Magazine Programmer's Technical Reference: The Processor And Coprocessor, pp. 61–64.

Dirkx, Erik, et al, "An Animated Simulation Environment For Microprocessors," Microprocessing and Microprogramming, vol. 24, No. 1–5, Sep. 1, 1988, Amsterdam, pp. 149–152 (see p. 151, left column, line 1–right column, paragraph 20; figure 2).

May, C., "NMIC: A Fast System/370 Simulator", SIGPLAN Notices, vol. 22, No. 7, Jul. 1987.

Banning, J., "The XDOS Binary Code Conversion System," COMPCON 89 (Sep. 27, 1989) San Francisco, CA, pp. 282–287.

Hunter, C., et al, "DOS at RISC," Byte, vol. 14, No. 12, Nov. 1989, pp. 361–368.

Gaines, "On The Translation of Machine Language Programs," Communications of the Association for Computing Machinery, vol. 8, No., 12, Dec. 1965, pp. 736–741.

Bergh, et al, "HP 3000 Emulation on HP Precision Architecture Computers," Hewlett–Packard Journal, Dec. 1987, pp. 87–89.

Cooper, et al, "BEYOND RISC!—An Essential Guide To Hewlett–Packard Precision Architecture," Software Research Northwest, Inc., 1988, pp. 225–238.

Tanner, E., "Providing Programmers With A Driver Debug Technique," Hewlett–Packard Journal, Oct. 1989, pp. 76–80.

Turbo Pascal Owners Handbook, Chapter 9, 1987, pp. 125–142.

Wright, M., "uP Simulators Let You Debug Software On An IBM PC," Electronic Design News, vol. 31, No. 25, Dec. 11, 1986, pp. 196–204.

Japanese Kokai Patent Appl. No. Sho62[1987]–73333, published Apr. 4, 1987, corresponding to Sho 60[1985]–214060.

Mosley, J., "Simulation on a Budget Avsim 51", Electronic World and Wireless world, vol. 96, No. 1655, Sep. 1990, pp. 801–804.

IBM Technical Disclosure Bulletin, vol. 15, No. 9, Feb. 1973, p. 2794 "Software Device Simulator".

"Inside Atari DOS" From the Editor's of Computer Magazine and Optimized System Software, Inc.

SYSTEM FOR EXECUTING AND DEBUGGING MULTIPLE CODES IN A MULTI-ARCHITECTURE ENVIRONMENT USING JACKETING MEANS FOR JACKETING THE CROSS-DOMAIN CALLS

CROSS REFERENCE TO RELATED APPLICATIONS

This application is a continuation of application Ser. No. 08/264,213, now abandoned, filed Jun. 17, 1994, which is a continuation of application Ser. No. 07/666,039, filed Mar. 7, 1991, now abandoned.

Reference is made to the following concurrently filed patent applications assigned to the present assignee and hereby incorporated by reference:

Ser. No. 07/666,028, filed Mar. 7, 1991, now abandoned, entitled SYSTEM AND METHOD FOR AUTOMATICALLY INTERFACING CALL CONVENTIONS BETWEEN TWO DISSIMILAR PROGRAM UNITS and filed by Daniel L. Murphy.

Ser. No. 07/665,888, filed Mar. 7, 1991, now abandoned, entitled IMPROVED SOFTWARE DEBUGGING SYSTEM AND METHOD ESPECIALLY ADAPTED FOR CODE DEBUGGING WITHIN A MULTI-ARCHITECTURE ENVIRONMENT and filed by James A. Wooldridge, Ronald F. Brender and Henry N. Grieb, III.

Ser. No. 07/666,022, filed Mar. 7, 1991, now abandoned, entitled IMPROVED SIMULATOR SYSTEM AND METHOD ESPECIALLY ADAPTED FOR CODE EXECUTION IN A MULTI-CODE EXECUTION AND DEBUGGING SYSTEM WITHIN A MULTI-ARCHITECTURE ENVIRONMENT and filed by Mark A. Herdeg and Michael V. Iles.

Ser. No. 07/666,072, filed Mar. 7, 1991, now abandoned, entitled IMPROVED SYSTEM AND METHOD FOR DETECTING CROSS-DOMAIN INSTRUCTION CALLS AND DATA REFERENCES ESPECIALLY ADAPTED FOR CODE INTERFACE JACKETING IN A MULTI-CODE EXECUTION AND DEBUGGING SYSTEM WITHIN A MULTI-ARCHITECTURE ENVIRONMENT and filed by Mark A. Herdeg, Scott G. Robinson, Ronald F. Brender and Michael V. Iles.

Ser. No. 07/665,752, filed Mar. 7, 1991, now U.S. Pat. No. 5,339,422, entitled IMPROVED SYSTEM AND METHOD FOR JACKETING CROSS-DOMAIN CALLS IN A MULTI-CODE EXECUTION AND DEBUGGING SYSTEM WITHIN A MULTI-ARCHITECTURE ENVIRONMENT and filed by Ronald F. Brender and Michael V. Iles.

Ser. No. 07/665,886, filed Mar. 7, 1991, now abandoned, which is entitled FASTER PROCESS FOR DEVELOPING NEW COMPUTER SYSTEMS EMPLOYING NEW AND BETTER PROCEDURES FOR SOFTWARE DEVELOPMENT AND TESTING and filed by Robert V. Landau, James E. Johnson and Michael V. Iles.

Reference is also made to the following concurrently filed patent applications assigned to the present assignee:

Ser. No. 07/666,071, filed Mar. 7, 1991, now abandoned, entitled IMPROVED SYSTEM AND METHOD FOR PRESERVING INSTRUCTION STATE-ATOMICITY FOR TRANSLATED PROGRAM CODE and filed by Scott G. Robinson, Richard Sites and Richard Witek.

Ser. No. 07/666,025, filed Mar. 7, 1991, now U.S. Pat. No. 5,307,504, which is hereby incorporated by reference and which is entitled IMPROVED SYSTEM AND METHOD FOR PRESERVING INSTRUCTION GRANULARITY FOR TRANSLATED PROGRAM CODE and filed by Scott G. Robinson and Richard Sites.

BACKGROUND OF THE INVENTION

The present invention relates to systems and methods for executing and debugging multiple codes in a multi-architecture environment and, more particularly, to improved multi-code execution systems and methods that operate with better flexibility and provide improved execution and debugging for new program codes developed for a new architecture before the hardware and operating system for the new architecture are available.

A large amount of development effort and monetary investment is required to design a new computer hardware architecture, develop a commercial computer product implementing the new architecture, and develop system and user software for use on the new computer product. As the time to develop new computer hardware and software increases, both the product investment cost and the product marketability may be adversely affected. Thus, greater commercial product development time usually requires more monetary investment by the manufacturer and its suppliers and users and, further, runs greater risk that anticipated market needs and other market conditions will have eroded before the new product is commercially available.

In any case, for economic and other reasons it is desirable for and beneficial to suppliers, manufacturers and users that the total hardware/software development time cycle be shortened. Significant development cycle shortening is achieved by a new process set forth in the cross-referenced application Ser. No. 07/665,886, now abandoned, in which hardware and software development processes can be run substantially concurrently rather than sequentially. The present invention is directed to system structure and processes that help shorten such development cycle shortening.

Some prior art technology has been available to allow limited development of software and hardware in parallel activity for a new computer hardware architecture. For example, simulators have been employed to emulate new hardware on existing hardware and thereby provide a limited working environment for software engineers who are responsible for writing new programs or migrating other programs to the new environment.

The relevant prior art technology, however, has limited utility because it addresses only the needs of developers of low level software and the operating system itself. No mechanism is provided for test execution of user level software which requires lower level and support software to be operable in the simulated environment or on the real hardware. In particular, an operating system and library support routines for the new architecture are normally not available as operating components of the simulator, thereby making the execution of user level software for the new architecture impossible. The operating system and higher layered software itself can be simulated but this alternative is very costly and complicated.

The present invention is directed to resolving these problems by providing a total architecture environment within which code for existing hardware and new user level and other code for new hardware can be executed to enable new code testing and debugging before the new hardware and an operating system and support software for it are available. Basically, a system or method implemented in accordance with the invention provides multiple code execution in a multi-architecture environment which may include an existing hardware environment and a simulation environment that employs the underlying operating system and support software employed in the existing hardware environment.

SUMMARY OF THE INVENTION

A mixed code image is created for execution in a multiple code execution system that provides a multi-architecture environment including a real X architecture and a simulated Y architecture.

A pair of jacket descriptions defines the calling conventions for incoming and outgoing calls for each routine in an X code module as well as for each routine in a Y code module to be executed by the execution system. X jacket objects and Y jacket objects are compiled from the jacket descriptions, and each of the jacket objects includes a jacket table embodying the corresponding jacket descriptions for each routine.

X objects are compiled from the X code module and Y objects are compiled from the Y code module. The X objects and the X jacket objects are linked to produce an X image.

An X image is further generated to include a multiple code execution and debugging system, and the Y objects and Y jacket objects are linked to produce a Y image. The X and Y images are activated for execution in the execution system.

The multiple code execution and debugging system includes environment manager and simulator components and may further include a debugger component.

The operating aspects of the invention are directed to the functioning of the multi-code execution system on an X computer. The simulator component simulates the Y architecture on the X computer. If provided, the debugger component is operated to debug X code and Y code in the multi-architecture environment. The environment manager component manages the operation of the simulator and debugger components and the X computer system to provide mixed X and Y code execution and debugging.

BRIEF DESCRIPTION OF THE DRAWINGS

The accompanying drawings, which are incorporated in and constitute a part of this specification illustrate one embodiment of the invention and together with the description provide an explanation of the objects, advantages and principles of the invention. In the drawings.

DESCRIPTION OF THE PREFERRED EMBODIMENT

Figure 1:
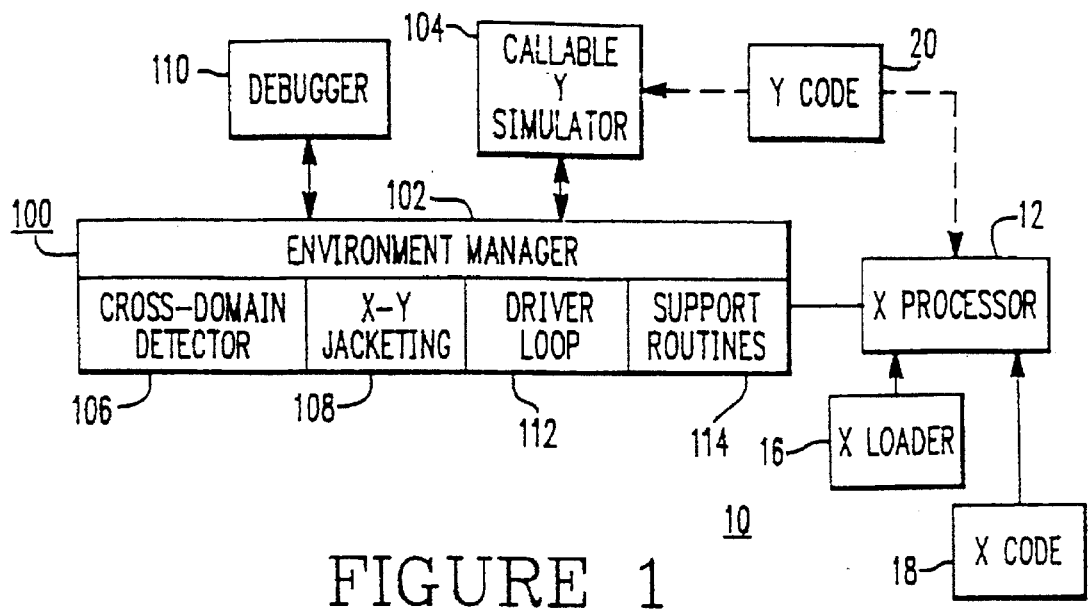
FIG. 1 shows a functional block diagram of a system for executing and debugging multiple codes in a multi-architecture environment in accordance with the present invention.

There is shown in FIG. 1 a system 10 that is arranged to execute and debug multiple codes in a multi-architecture environment. An X processor 12 forms a part of a real X architecture that provides for the execution of multiple codes including X code 18.

Generally, the system can be operated to process and execute multiple codes, but in the preferred embodiment, the system 10 is structured for executing up to two codes: X code 18 and another code for a simulated hardware which code is designated as Y code 20. The system 10 may directly execute a new user application level or other program compiled in or translated to Y code and, in doing so, make use of X operating system and support software.

Figure 2:
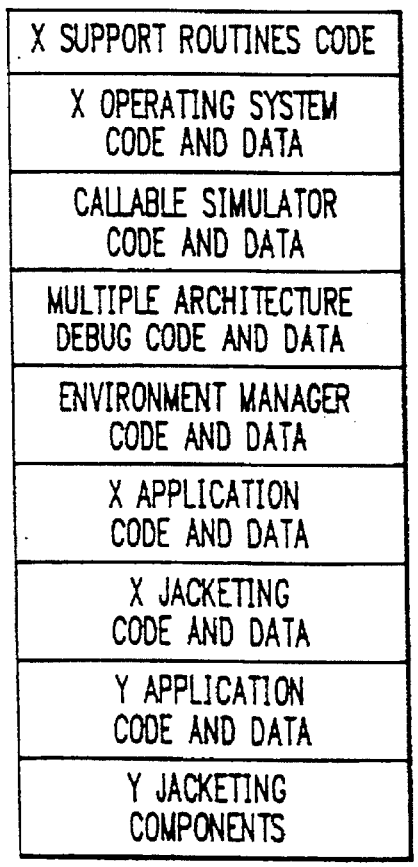
FIG. 2 shows a diagram representing a general program memory layout for the system of FIG. 1.

An X loader 16 provides for program code entry into a memory system 14 (FIG. 2) within which various program and data components of the system 10 are stored for execution. A general layout is shown in FIG. 2 for programs contained in the memory system 14. Various memory components are indicated as functional block components in FIGS. 1 and 3.

With use of the code translation system and method disclosed in the cross-referenced applications Ser. Nos. 07/666,071 now abandoned, and 07/666,025, now as U.S. Pat. No. 5,307,504 user application level and other X programs can be translated to functionally equivalent Y programs. As an illustrative application of the present invention, such Y programs can be executed on real X hardware by the system 10 for testing and debugging purposes even though operable Y hardware is unavailable.

Advantageously, an X program can be partially translated to Y program code, or a new program can be partially written in Y code for execution with supporting or other X program code, and the mixed X-Y program code can be executed by the system 10 for testing and debugging of both the X and Y codes. The Y code is executed, tested and debugged on the simulated architecture, and the remaining X code is executed, tested and debugged on the native architecture. With successful testing of the existing Y code, additional segments of X code can be translated for stepped Y code testing and debugging until the X code is fully translated and the Y code testing and debugging is completed. With the use of progressively stepped testing and debugging, the entire testing and debugging process is facilitated.

Overall, a program can be executed and tested for the Y architecture by translating or compiling it into Y code and running the Y code on the callable system simulator. The run-time environment for the Y code is provided by the operating system and run-time libraries executing on the X or native hardware architecture that is included in the multi-architecture system. The composite software thus includes X and Y codes that are properly executed on the combined X (real) and Y (simulated) architectures. In the preferred embodiment described herein, the operating system for the composite software system is structurally included in the X domain.

The partitioning of code between the real and simulated architectures is generally open to the system user's needs. For example, the code boundary can be between the program being ported and the X operating system or, as indicated above, it can even be within the program being ported.

The software system 100 generally has application to widely different architectures. The system 10 also has application to architecture-implementation systems that have different operating systems and different calling systems, but such application is facilitated if the architecture-implementation systems have similar operating systems and similar calling standards. Reference is made to the cross-referenced application Ser. No. 07/665,752, now U.S. Pat.

No. 5,339,422, for additional background information on calling systems and differences among them.

FIG. 1 shows the architecture of a software system 100 which can be executed by the system 10. A callable simulator 104 functions as part of software system 100 (FIG. 1) within a second architecture (domain), which is preferably a Y architecture embodied in the X hardware. The simulator 104 is structured to emulate Y hardware on the X hardware that may be under development and unavailable. In the preferred embodiment, a callable simulator 104 functions within a second environment (domain), i.e., a Y architecture that is embodied in the X hardware. The simulator 104 is structured to emulate Y hardware (that may be under development and unavailable) on the X hardware. Generally, the simulator 104 executes Y instructions on call from X code through an environment manager 102. Calls may also be made from the Y code through the environment manager 102 for X code execution. For example, the Y code may represent a user level application program and may call for execution of a routine that is located in an X library, or it may make a call requiring operating system processing in the X domain. For a detailed description of the structure and operation of the simulator 104, reference is made to the cross-referenced application Ser. No. 07/666,022, now abandoned.

A debugger system 110 also operates under control of the environment manager 102. In its total operation, the debugger system 110 provides the user with control over the whole execution of code in either domain so that the execution process may be examined and modified to correct malfunctions. Generally, the debugger 110 is structured for interaction with the callable simulator 104 and provides the procedures needed for debugging operations such as setting breakpoints in both the X and Y domains.

The debugger 110 can be turned on and off by user selection. When the debugger 110 is activated, code execution is controlled by the setting of breakpoints. For example, the code may be executed to a point where it is believed a problem may exist, and, with the execution stopped, program state and data state can be examined for errors.

Reference is made to the cross-referenced application Ser. No. 07/665,888, now abandoned, for a detailed description of the structure and operation of the debugger system 110.

The environment manager 102 interfaces the domains for cross-code calls. Thus, a cross-domain call detector system 106 is employed by the environment manager 102 to determine when a cross-domain call is made during the execution of either the X code or the Y code. An X-Y jacketing system 108 operates within the environment management system to provide the X and Y executable instruction interfacing needed to implement cross-domain calls between routines. Reference is made to Ser. Nos. 07/666,072 now abandoned and 07/665,652 now U.S. Pat. No. 5,339,422, for more detailed disclosure of the detector and jacketing systems 106 and 108.

The environment manager 102 manages the flow of execution control between domains and for this purpose exercises supervisory control over the callable simulator 104 and the debugger 110 through the execution of a driver loop 112. Support routines 114 provide various services to the debugger 110 and the simulator 104.

The support routines 114 include a suitable initialization procedure, suitable illegal address mapping, cross-domain pre-check for debugger operations, and partitioning of domain address space for debugger, cross-code call detector and simulator operations. The set of memory address ranges that constitute the simulated architecture domain are maintained for the environment manager 102 by a facility housed in the simulator 104. Callable routines are provided for initializing the Y domain, adding to the Y domain, and querying whether a particular address is within the domain.

Cross-domain data references from the X domain are made directly since memory data is globally accessible. However, in the present embodiment, Y domain references to X memory are processed through the environment manager 102 for jacketing.

DRIVER LOOP

Figure 4:
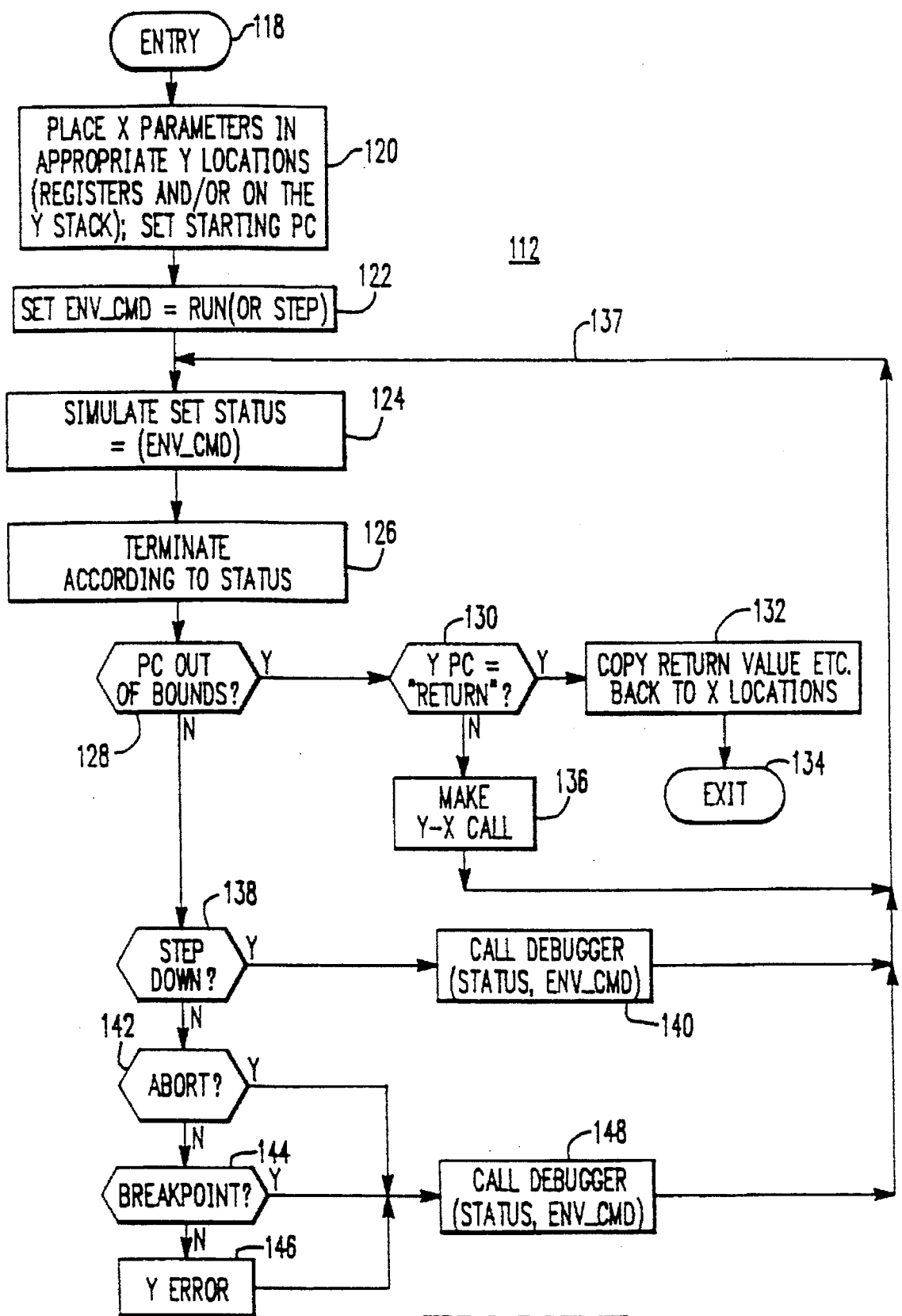
FIG. 4 shows a flow chart for a simulator/debugger driver loop employed by an environment manager in the system of FIG. 1.

FIG. 4 shows a flow chart for the driver loop 112 which drives the simulation/debugging operation. Entry is made to the loop 112 at block 118 on a cross-domain call from X code, often X application code, for execution of a Y routine through the jacketing system 108. Jacketing provides interfacing between the X and Y codes to adjust for calling standard differences.

In mixed code applications, cross-domain routine calls from the X domain are made by X application code. In the case of single Y code execution, a suitable X startup mechanism initiates Y code execution.

In block 120, parameters are set up and in particular X parameters are placed in appropriate Y locations for use during Y code execution as part of the jacketing process. For normally jacketed cross-domain calls for routines, jacketing tables are referenced to determine where parameters come from in the X domain and where the corresponding values must be placed in the Y domain. For auto-jacketed cross-domain calls for routines, standard call rules are embedded in special code for this purpose in the jacketing system 108. More detail on jacketing for domain interface purposes is set forth in the cross-referenced application Ser. No. 07/665, 752, now U.S. Pat. No. 5,339,422.

A distinguished return address is placed in the standard return-address register. The distinguished address is outside the address bounds previously established as containing Y code. It must also be different from an address that might be used to encode a Y-X call.

In functional block 122, a string variable named ENV_CMD is maintained in an environment manager buffer and is set by default to RUN mode (continuous instruction execution). It can be set to STEP mode (instruction-by-instruction execution) by a user selection from the debugger 110. For example, the user may decide to perform maintenance on the particular Y routine that has been called by an X code routine, and accordingly may make a STEP mode selection for the Y domain.

The simulator 104 is called by block 124 to simulate the Y machine in accordance with the selected mode and the current Y machine state. One or more Y instructions are then executed in the Y domain by the simulator on the X hardware.

Block 126 next provides for loop termination and return according to detected conditions returned from the simulator 104 after its operation has terminated. If the Y program counter is determined to be out of bounds previously established as containing Y code and data, as indicated by block 128, a test block 130 determines whether the Y program counter is making a return to the caller X program.

If the Y program counter matches the distinguished return address in the block 130, the Y routine has completed and is making a return to its X caller. Block 132 then provides jacketing services, by copying values as appropriate from the Y results register(s) to the X domain. Normally jacketed calls are processed with the jacketing tables used to initiate the original call. The previously referenced special jacketing code is used for auto-jacketed calls. Simulation is complete at this point as indicated by exit block 134.

If the test block 130 determines that the Y program counter corresponds to a jacketing table entry and does not match the distinguished return address, a call is made for an X routine (in the absence of a programming error). Block 136 then provides jacketing services, by initiating a Y-X call, and the jacketing system 108 accesses the jacketing tables to obtain the information needed to copy parameters from the Y-domain to the X domain, the address of the X routine being called, etc. When a return is made from the X routine, the return value is copied into the Y domain and simulation is resumed as indicated by path 137.

With reference again to block 126, if the STEP mode had been requested and the simulation termination is accordingly determined to be a case called "Step Done", as indicated by block 138, functional block 140 calls the debugger 110 to indicate completion of the requested step operation and pass the previously returned status and the variable ENV_CMD. A return to the simulator 104 over path 137 enables resumed simulation without requiring direct simulator recall by the debugger 110.

The debugger 110 interprets the status and may make a report to the user. Additional step operations are requested by the debugger 110 in accordance with a previously established internal script or by user selection. The driver variable ENV_CMD is set to RUN or STEP according to debugger requests.

The debugger 110 calls the environment manager 102 to perform other inquiry and status control functions (such as set BREAKPOINT) as more fully considered in the cross-referenced application Ser. No. 07/665,888, now abandoned. Simulation is controlled only by the driver 112.

If the simulation is due to an abort 142 or a breakpoint 144 or Y errors 146, block 148 calls the debugger 110 and operates in the manner described for the block 140.

PROCESS FOR CREATING OPERATIONAL PROGRAM SYSTEM

Figure 3:
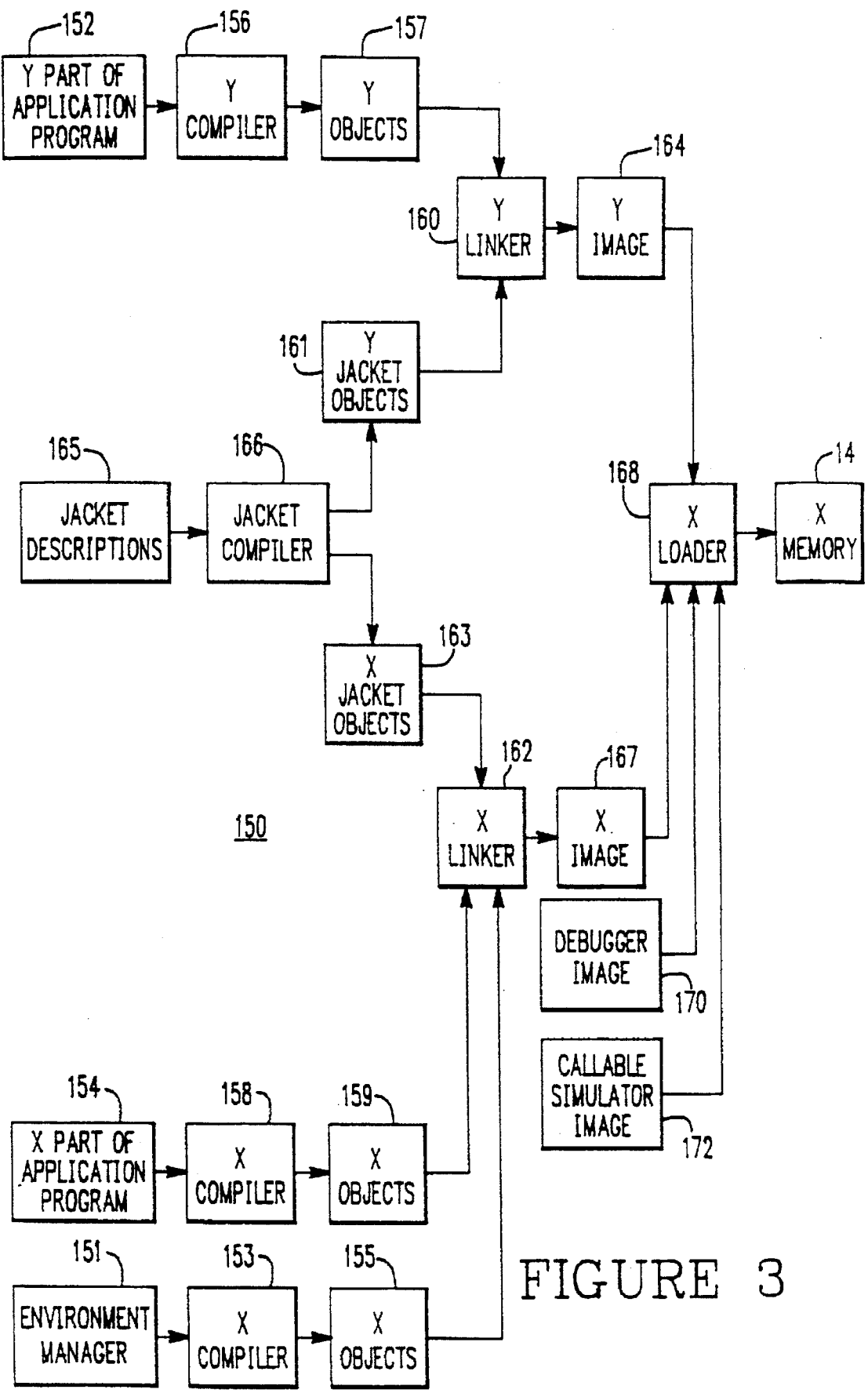
FIG. 3 shows a functional block diagram representing the process by which programs are created for the multi-architecture system of FIG. 1.

A functional block diagram in FIG. 3 represents a process 150 employed in the preferred embodiment of the invention to create the system of programs that are stored in the memory 14 and operate as component parts of the multi-architecture, multi-code execution and debugging system 10. Although the system user may generally enter programs of any level for debugging or other execution, an application program at the user level is employed in the process 150 as the application program to be entered into the system 10 since it clearly illustrates the operation and advantages of the present invention.

As indicated, the application program to be entered is divided into a Y program part 152 and an X program part 154. For example, in migrating an existing X user level program to the Y architecture well in advance of the availability of Y hardware and its operating system, a modular or other part of the X program may be translated to Y code that forms the Y program part 152. After the two program parts 152 and 154 are entered into the system 10, debugging can be performed on the Y program part 152.

Subsequently, an additional modular part of the X program can be compiled to a new Y program part which is then entered with the debugged Y program part and the remaining X program part for debugging of the new Y program part.

This modular or phased debugging process makes debugging more manageable and more convenient for several reasons including the fact that the full functionality of the final image is available to the ported Y module 152. The phased process is continued until the entire X program is converted to an equivalent debugged Y program.

In addition to enabling advance debugging as previously described, the present invention greatly facilitates the debugging process itself. Generally, user level code for the X and Y and, if desired, other architectures may be freely intermixed for execution and debugging by systems embodied in accordance with the invention.

The Y application program part 152, which may include multiple source files corresponding to respective routines or subprograms, is processed by a Y cross compiler 156 to produce one or more Y object files 157. Similarly, an X compiler 158 processes the X program part 154 to produce an X object image 159 having multiple X object files.

A cross linker program 160 combines Y object files by providing cross file linkages between calling and called Y object files (routines) in accordance with applicable calling conventions for the Y architecture. An X linker program 162 similarly combines X object files.

Since Y object files (routines) may make cross domain calls for execution of X object files (routines), and vice versa, an X-Y call interface is integrated with the Y object files and the X object files respectively by the linkers 160 and 162 thereby facilitating cross-domain execution switching at run time. Specifically, Y jacket object files 161 and X jacket object files 163 are respectively linked with the Y object files and the X object files by the linkers 160 and 162.

In the present embodiment, source code 151 for the environment manager 102 is compiled at 153 to generate X object files 155. The X linker 162 also links the environment manager object files 155 with other object files in producing a combined X image 167.

The Y cross linker 160 is combines Y object files together into a single image. A Y image is generated by the Y linker that contains Y code but is externally formatted as a standard shareable X image.

In the preferred embodiment, a global data system is employed so that each code X or Y can generally access all data. However, protected locations may require special processing for cross-domain access from the Y domain.

To build the call interface, jacket descriptions 165 are prepared by the user for each X and Y routine on the basis of knowledge of the applicable X and Y call conventions. In the preferred embodiment, a pair of jacket descriptions is prepared for each routine, i.e. one that applies to the calling domain and one that applies to the called domain.

A jacket compiler 166 processes the jacket descriptions to build jacketing tables which can be interpreted by other software at runtime to effect jacketing operations needed for cross-domain execution. A more complete description of jacketing and cross-domain call detection is provided in the cross-referenced applications Ser. Nos. 07/666,072, now abandoned and 07/665,752 now U.S. Pat. No. 5,339,422.

An X loader or image activator 168 links the Y image 164, the X image 167, an image 170 for the debugger 110 and an image 172 for the simulator 104. The output from the X loader 168 is loaded into the X memory 14 and formed into executable code.

SYSTEM OPERATION

A mixed or multi-architecture run-time environment exists at run-time for the system 10 (FIG. 1) as a result of the loading operation just described. In the multi-architecture environment, Y code under test is able to call out to X code for convenient use and full speed execution of available facilities and services that are operational and not under test.

The loaded Y image contains all of the binary Y code to be executed by the simulator 104 with no external references to other images and no run-time fix-ups. Additional Y code supports the Y environment to facilitate access to every callable routine in the Y image, to compute the address of a target routine at run-time, to provide a Y hardware context block for the simulator 104 (FIG. 1), to provide control over indirect calls from the Y domain, and to provide proper delivery of Y exceptions after formatting in the X domain.

Once the simulator 104 is invoked to commence simulation, execution of Y instructions continues until the simulator 104 can proceed no further. Apart from exception conditions, instruction execution normally stops when the simulator 104 generates a target instruction address outside the predetermined Y code range.

The Y domain has no memory management function since memory management is performed in the X domain.

The loaded X image includes user program modules, which is code from an application that the user has chosen to keep in X code rather than have it ported to Y code. Jacketing data tables, compiled as previously described, provide data used at run-time to enable routines in one domain to call routines in the other domain. The tables also enable data references from Y code to be intercepted for processing, such as to access protected data in the X domain for use in the Y domain.

In addition, the loaded X image includes Y routine entry points. Such points are jacketing routines provided for X to Y calls and Y to X calls. Transferred data includes input and output parameters and completion status values for return from the called domain to the calling domain. An X to Y call invokes operation of the callable simulator 104 for reception of the jacketed data.

A debugger image provides for operation of the debugger 110. It functions in both or either of the X and Y environments. For example, it displays both X and Y instructions symbolically and sets breakpoints in the X and Y code. If desired, the debugger can be deactivated when the system is used only for execution of mixed code without debugging.

To start the system 10 for operation, a suitable stub startup program is provided in X code in the preferred embodiment. X code execution continues if the next code module contains X code. Otherwise, the next code module contains Y code and the cross-domain detector 106 identifies the need to switch execution from the X domain to the Y domain. If no X application code is provided in a particular use, the system 10 is directly switched to Y code execution and cross-domain calls from the Y code could then be made for execution of X support routines.

Figure 5:
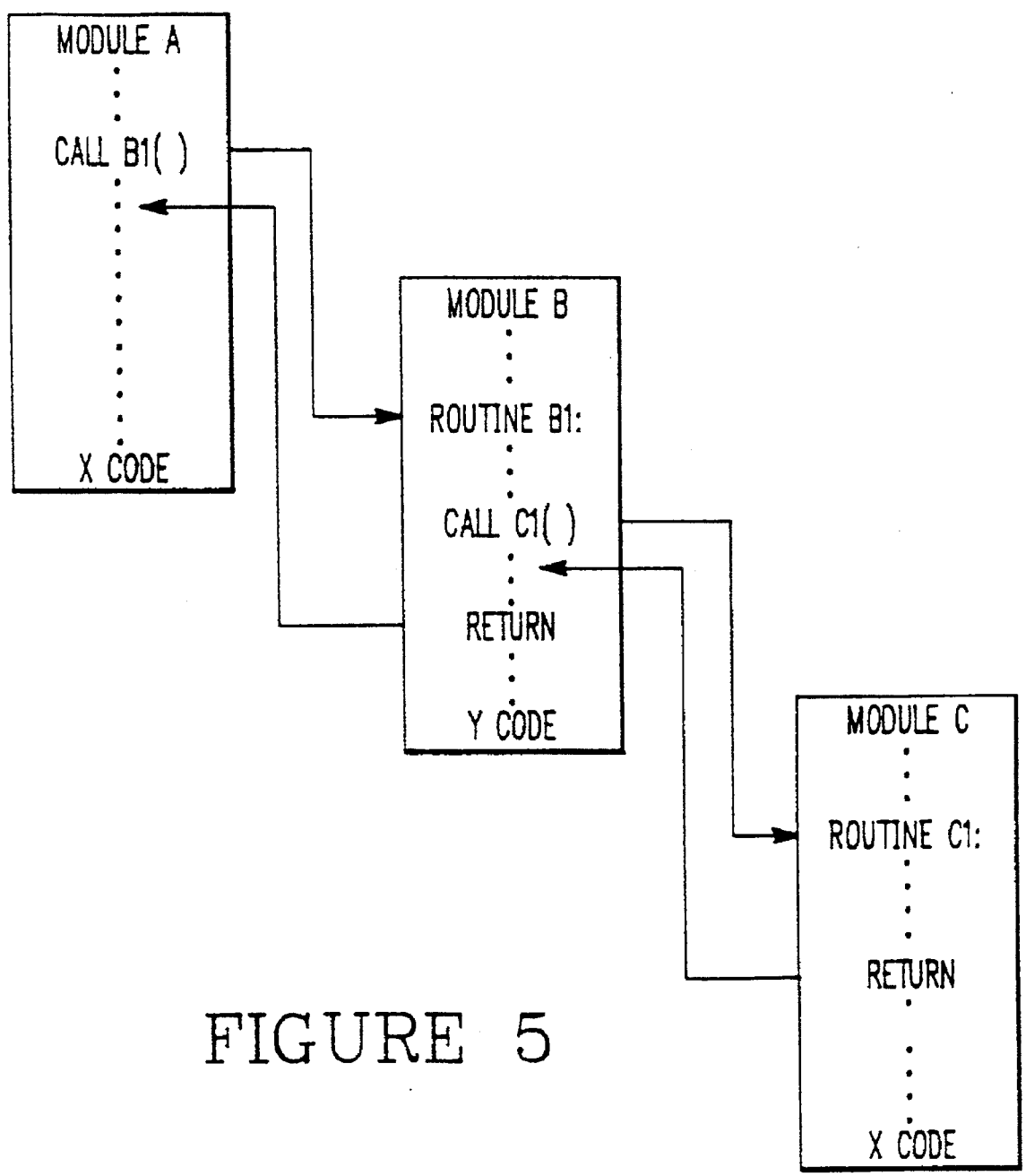
FIG. 5 shows a diagram illustrating cross-domain switching operation of the system of FIG. 1.

In FIG. 5, there is shown a diagram illustrating the switching operations for mixed code execution. A sample multi-code program includes three modules each containing a number of routines. In module A, an X code routine A1 calls a Y code routine B1 in module B. An execution switch is made to the Y domain and, in the course of execution, the routine B1 calls another X code routine C1 in a module C. With execution control switched across domains to the module C, X code execution continues to the termination of the routine C1.

A domain switch is then made by a return back to the Y routine B1. The routine B1 completes and a cross-domain return is made to the original caller A1.

With reference to FIG. 4 again, once a cross-domain X-Y call is detected, the environment driver loop 112 (FIG. 4) is entered at 118 to start simulator driver loop execution and the jacketing system 108 operates (block 120) to jacket the call data (called address, input/output parameters, etc.) for transfer from the calling routine in the X domain to the called routine in the Y domain.

If the debugger 110 is inactive, block 122 requests a RUN status for the simulator 104, and block 124 calls the simulator as previously described. Simulator execution of Y code then continues until a return is made as described in connection with FIG. 4. A cross-domain switch occurs if a return is made by the block 132 or if an X call is made by the block 136.

If the debugger is selected to be active, code execution in either the X or the Y domain can placed in the STEP mode. In the Y domain, the block 122 (FIG. 4) sets the simulator status to STEP mode and STEP operation occurs as previously described.

Other debugger commands are implemented through the environment manager 102 for application by the simulator 104 to the Y environment. Code breakpoints can be set, canceled and listed for debugging purposes. Memory access is provided by EXAMINE and DEPOSIT commands to enable the user to inspect and modify memory locations. More detail on debugger and simulator operation is set forth in the cross-referenced applications Ser. Nos. 07/665,888, now abandoned and 07/666,022 now abandoned.

SYSTEM FOR DETECTING CROSS-DOMAIN CALLS

Figure 6:
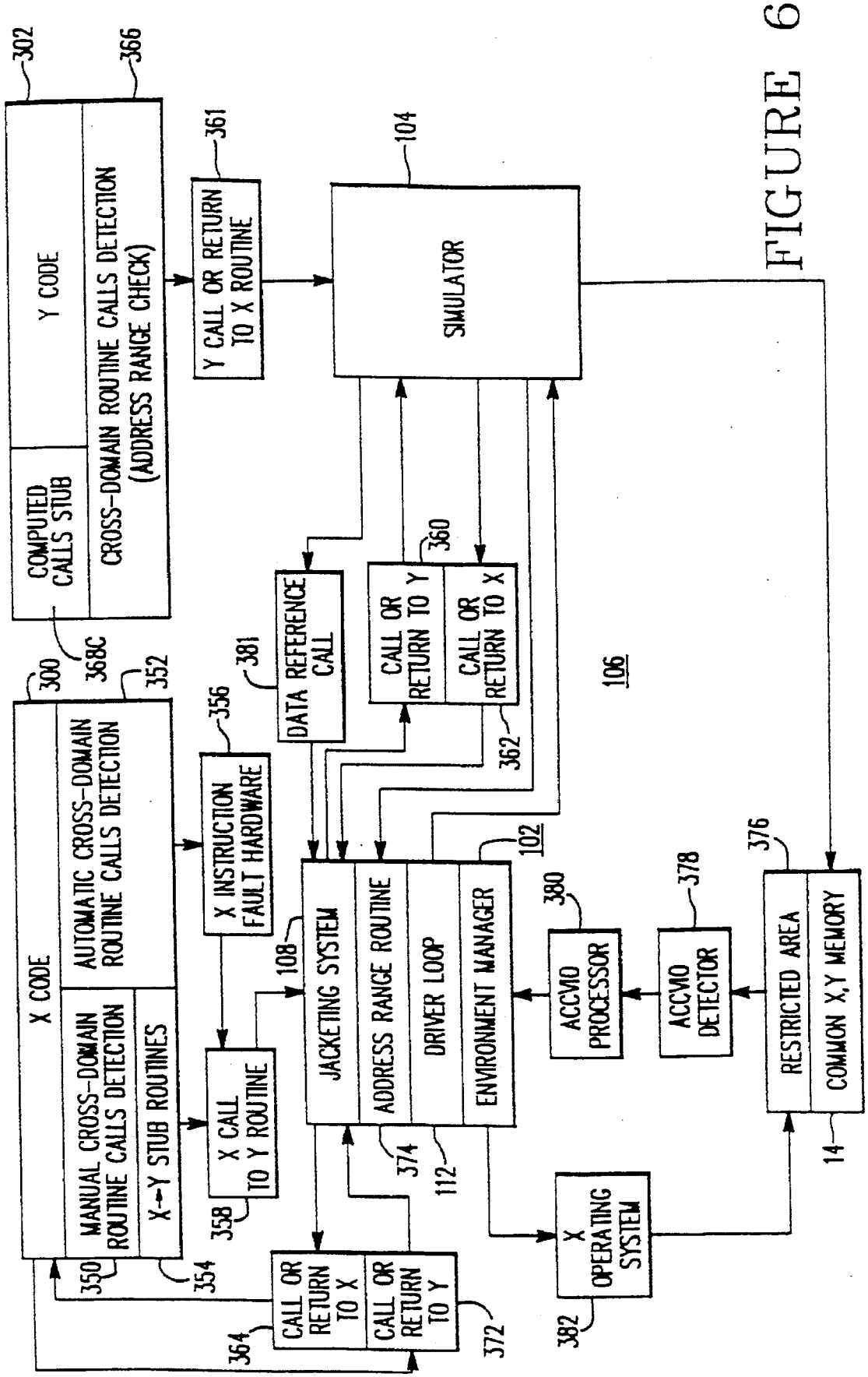
FIG. 6 shows a functional block diagram for a cross-domain call detection system employed in the system of FIG. 1.

A functional block diagram shown in FIG. 6 provides a more focused perspective of the cross-code detection system 106. Generally, the jacketing system 108 provides the jacketing needed to interface a call from the X or Y domain to the other Y or X domain once a cross-domain call has been detected by the detection system 106.

A cross-domain call may require a switch in the code execution from one domain to the other domain (i.e., a call for execution of a cross-domain routine). A cross-domain call may also require processing of a cross-domain data reference which, in this case, may be a request from the Y domain to read or write certain memory locations assigned to the X domain (even though the X and Y memory addresses in the memory 14 are generally globally accessible).

When X code 300 reaches a point in code execution by the X processor 12 (FIG. 1) where a switch is to be made for execution of a routine in the Y domain, the call detection system 106 causes the jacketing system 108 to jacket the call as the driver loop 112 initiates operation of the Y simulator 104 and execution of the targeted Y routine. The simulator 104 accepts the jacketed call and executes the called routine through execution of Y code 302 in the Y domain.

A call for a return to the X domain is then made by the simulator 104 and call detection and jacketing provide for sending the return to the X domain.

In the X to Y direction of code switching, two different detection mechanisms are employed for determining when a cross-domain routine call is to be made. A mechanism 350 manually detects X calls for execution of Y routines, and another mechanism 352 automatically detects certain other X calls for execution of Y routines.

The mechanism 350 is termed a "manual" detector since the detection is produced by structure inserted into the X code during the X image building process described in connection with FIG. 3. Thus, an X-Y stub or X routine 354 is inserted into the X code at each of preselected points in the code where a call is to be made for execution of a routine in the Y domain.

The X stub routines 354 may be employed in those cases where the address of the called routine in the Y domain is known at link time. A separate one of X stub routines 354 is provided for each callable Y routine. In effect, the X stub routines 354 are surrogate routines that transmit the Y routine call to the jacketing system 108. The X stub routines 354 provide a combination of very fast detection and very fast access to jacketing tables which support general jacketing capabilities.

The X stub routines 354 provide two basic functions: load a jacket index code onto the execution stack, and jump to a common entry point in the environment manager 102 to carry out the X-Y call indicated by that index value. Thus, detection of an X-Y cross-domain call by an X stub 354 occurs by the fact that execution has reached that X stub 354.

The automatic detection mechanism 352 is a hardware trap that employs X instruction fault hardware 356 to issue an exception when a cross-domain call occurs. The exception is interpreted and processed by the environment manager 102 for jacketing of the call by the jacketing system 108. The automatic detection mechanism 352 is employed for dynamically computed calls, i.e., where it is not known at link time whether a particular call is a cross-domain call. The automatic mechanism 352 works no matter which domain contains the called routine. As shown in FIG. 6, routine 358 handles X to Y calls detected by the stub structure 354 and the instruction fault hardware 356.

Block 360 indicates the passing of a call jacketed by the jacketing system 108 to the simulator 104 for execution of the target routine in the Y domain. Once the target routine is executed, a return is made for jacketing and transmittal to the X domain as indicated by blocks 361, 362 and 364.

Cross-domain calls for execution of an X routine are made during execution of Y code 302 by the simulator 104. When a point is reached in the execution of the Y code 302 where an execution switch is to be made to the X domain, the call detection system 106 detects the cross-domain call and causes the simulator 104 to initiate jacketing of the call by the jacketing system 108.

The target X routine in the X code 300 is then executed, and a return is processed and jacketed to the simulator 104 which then resumes execution of the Y code 302.

In the present embodiment, a mechanism 366 is employed for detecting all Y to X cross-domain routine calls. Checks 368 are preferably employed against the Y address range to detect most Y-X calls since most referenced addresses are known at linktime. A special stub 368C is preferably employed for dynamically computed calls.

Routine calls are passed by the check structure 368 to the simulator 104 as indicated by block 370. An address range routine 374, one of the support routines 114 (FIG. 1), is then called to determine which domain contains the address of the target routine.

If the X address range is found, a return is made to the driver loop 112 in the environment manager 102 for cross-domain call processing. A Y-X call is thus passed for jacketing by the jacketing system 108 as indicated by the block 362. Once jacketed, the call is passed as indicated by the block 364 for execution of the target routine in the X code 300. A return is made after the execution is completed as indicated by block 372 and the block 360.

CROSS-DOMAIN CALL JACKETING SYSTEM

Figure 7:
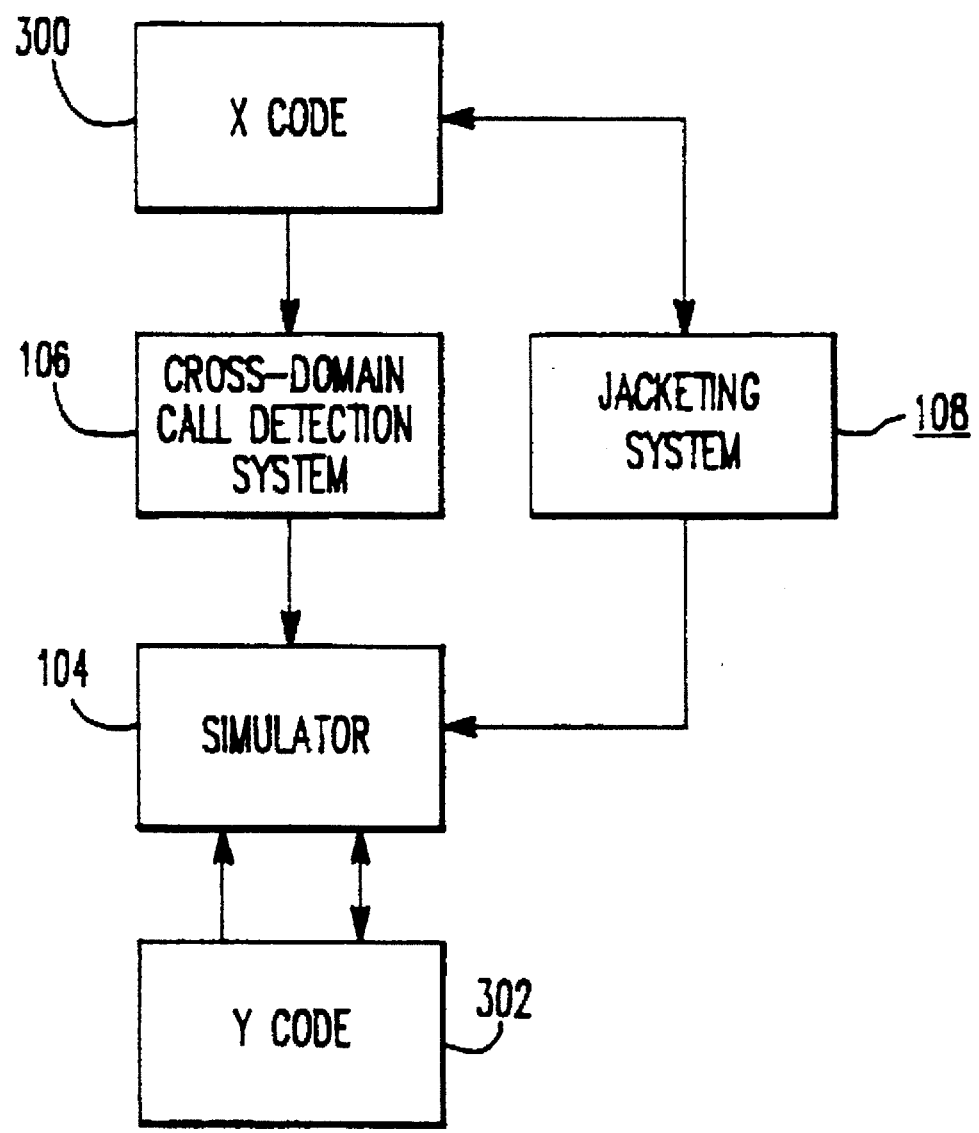
FIG. 7 shows a functional block diagram for a call jacketing system employed in the system of FIG. 1.

A functional block diagram in FIG. 7 focuses on the manner in which cross-domain interfacing is achieved. Specifically, FIG. 7 shows the manner in which cross-domain execution calls are detected, jacketed, passed for execution, and returned upon completion of execution. When X code 300 reaches a point in code execution by the X processor 12 (FIG. 1) where a switch is to be made for execution of a routine in the Y domain, the call detection system 106 employs a hardware fault interrupt or a stub routine structured into the X code at link-time to detect the call for execution of a Y routine. The jacketing system 106 jackets the call as the driver loop 112 initiates operation of the Y simulator 104 for execution of the targeted Y routine.

In the preferred embodiment, the X call may be detected by a hardware trap or by a stub routine structured at link-time into the X code. Once a routine call is detected, the jacketing system 108 jackets the call by reference to the jacketing tables. The simulator 104 accepts the jacketed call and executes the called routine in the Y code 302 in the Y domain.

A request for a return to the X domain is made by the simulator 104 and call detection and jacketing provides for sending the call return to the X domain. Execution of the X code 300 by the X processor 12 is then resumed.

If the Y code 302 is being executed by the simulator 104 and a point is reached in the Y code where a switch is to be made for execution of a routine in the X domain, the call detection system 106 detects the cross-domain call and causes the simulator 104 to initiate jacketing of the call. In the preferred embodiment, the Y call is detected by an address range routine or by a common stub routine structured at link time into the Y code. Again, the jacketing system 108 jackets the call by reference to the jacketing tables.

The targeted routine in the X code 300 is then executed by the X processor 12. Once the execution of the targeted routine is completed, a return call is detected and jacketed and sent in the X to Y direction across the domain boundary in the manner previously described. The Y simulator 104 restarts to resume execution of the Y code 302.

The call jacketing system 106 also jackets calls for processing of cross-domain data references. In this embodiment, such data references may include a request from the Y domain to read or write certain memory locations assigned to the X domain (even though the X and Y memories are generally globally accessible).

The jacketing of calls from one domain to the other domain is effected by run-time routines that are driven by the jacket tables created at image build time, as previously indicated. The run-time jacketing code and data are produced by the JDL compiler and combined into the X and Y codes by the linkers.

Jacketing requires that knowledge of all of the relevant calling convention characteristics for each subprogram in each domain be available to the jacketing mechanism. In the present embodiment, the previously noted jacket tables are created and integrated with the X and Y images at link time so that calling routine and called routine conventions can be determined for proper call passing across the domain boundary between any X or Y routine and any Y or X routine.

Each subroutine may have calling convention characteristics that are different from the characteristics of all other subroutines. The previously referenced jacket descriptions are accordingly prepared for the respective subprograms in the X and Y codes.

Generally, the jacket descriptions describe Y routines that may be called from the X domain and X routines that may be called from the Y domain. Each description lists the described routine by name and defines the manner in which parameters are passed to and from the routine as previously indicated. Where the calling mechanism for a routine conforms to the calling standard for the domain in which it is located, no linkage description need be associated with that routine.

Each routine described has two descriptive parts, one for the calling domain side and one for the called domain side (the latter being where the actual code is found). Either or both of these descriptive parts can be implicit. If no explicit linkage is given for a domain, an implicit linkage description is assumed to reflect the calling standard for that domain.

In the jacket tables, the jacket for each call from any one routine in one domain to any other routine in the other domain is thus defined by a pair of jacket description files. One file of the pair describes how the outgoing caller references the target, and the other file describes how the incoming routine expects to be referenced. Call linkage is implemented at run-time by the jacketing code.

CALLABLE SIMULATOR

Figure 8:
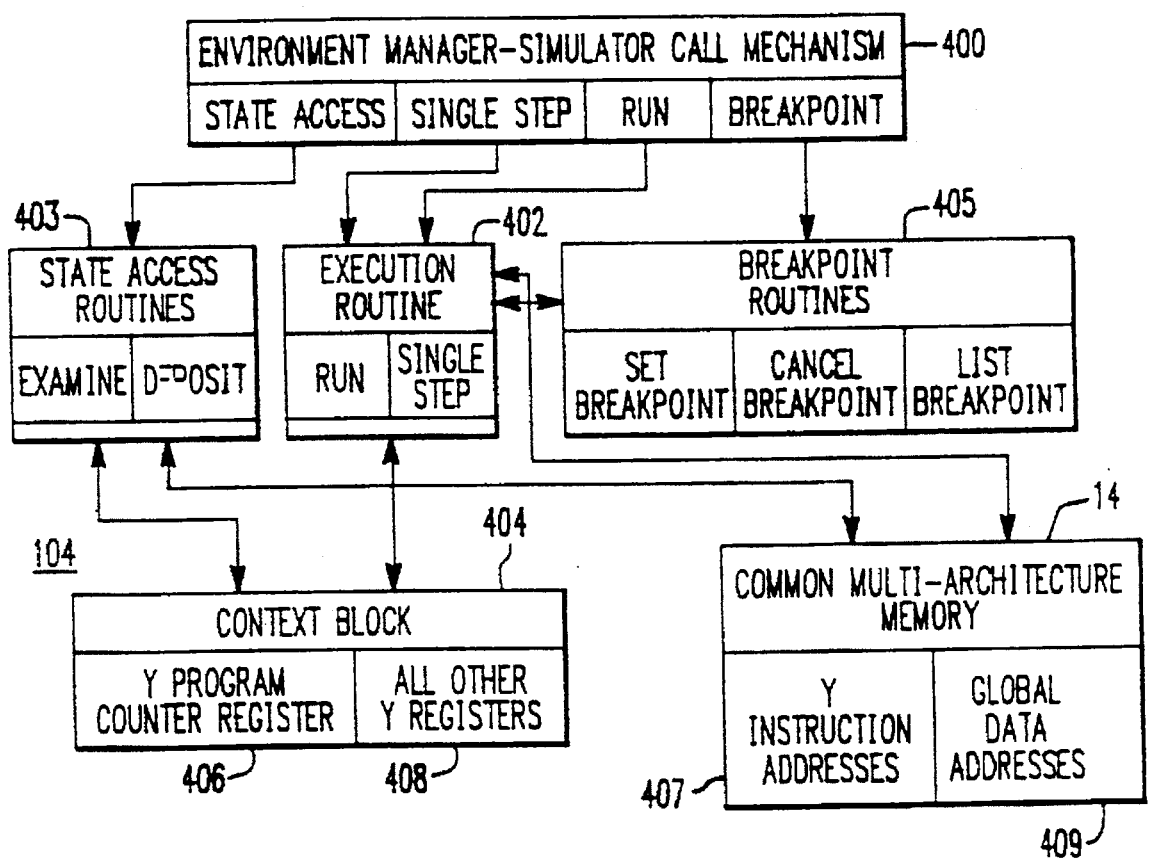
FIG. 8 shows a functional block diagram representing the software and hardware structure of a callable simulator and related system components employed in the system of FIG. 1.

The callable Y simulator 104 is shown in greater detail in FIG. 8. It provides a number of services to the software system 100 that may be classified into two categories: execution services and debug support.

When a system call is made for simulator execution from the environment manager 102 (FIG. 1), execution routines 402 (FIG. 8) are called to direct execution of the Y instructions and to provide returns under various circumstances, as more fully described hereinafter. Once the callable simulator 104 is called to begin execution, it continues to execute Y instructions and updates the simulated machine state (context block and memory) until any of multiple predetermined conditions arise to stop the execution and make a return to the caller. A unique return status is returned for each return reason.

State access routines 403 and BREAKPOINT routines 405 are also included in the simulator 104 to provide debugger services and are executed when a call is made for special functions provided by the routines 403 or 405.

The machine state of the simulated Y architecture is contained in a single, globally-defined context block 404 (FIG. 8). As shown, the context block 404 includes the Y program counter (PC) register 406 and all other Y registers 408.

The PC register 406 contains address data 407 of the next Y instruction to be executed. All instruction addresses, as well as all global data addresses 409 in the simulated architecture (Y) code, are located in shared address space in the common memory 14 (FIG. 2) for the multi-architecture system 10. No separate private Y code memory is maintained by the simulator 104 whereas conventional simulators normally do maintain a separate private memory. With common memory and shared common addresses between the X and Y architectures, multiple architecture programs with global data structures shared between X and Y routines will execute properly without modification.

The initial Y machine state is set up prior to simulator operation by the environment manager 102 by writing to the context block 404 and by initializing program memory 407 and 409. In particular, the address for the first simulated (Y) machine instruction to be executed is written to the PC register 406.

DEBUGGER

Figure 9:
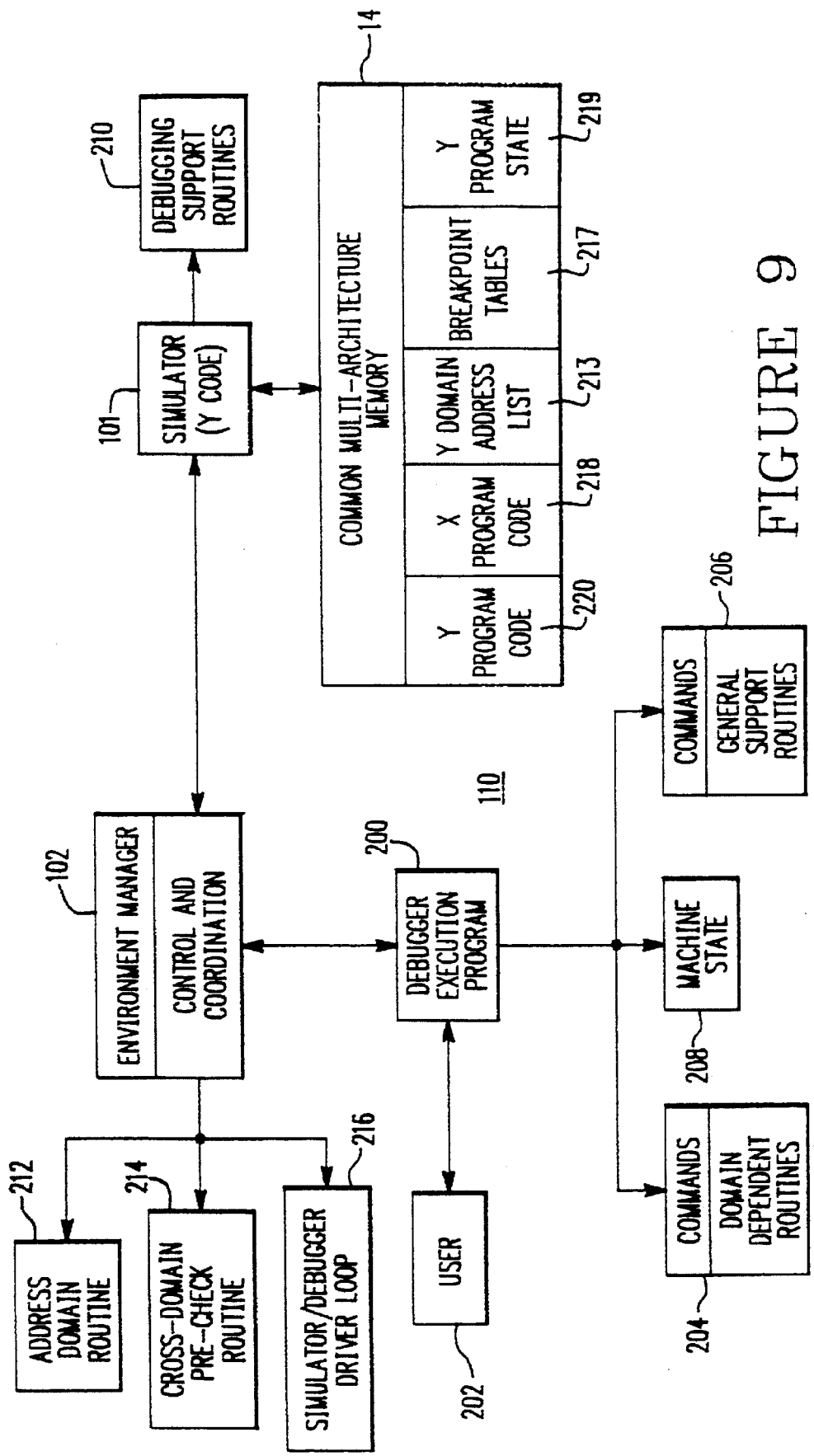
FIG. 9 shows a functional block diagram representing the software and hardware structure of a debugger employed in the system of FIG. 1.

When selected for use, the debugger 110 provides for debugging operations in both the X and the Y domains and is shown in greater detail in FIG. 9. In addition, portions of the common multi-architecture memory 14 most pertinent to debugger operation, and debugger related routines housed in other components of the software system 100 are shown in FIG. 9.

A debugger execution program 200 is structured to be interactive with a user as indicated by block 202. Accordingly, the user is enabled to detect and correct malfunctions in X or Y program code being executed by the multi-code execution and debugging system 10.

Basic debugging functions are commonly provided by the debugger 110 for both the X domain and the Y domain. The procedures and mechanisms by which basic debugging functions are implemented are different for the X and Y domains.

To provide for program malfunction detection and correction, the debugger program 200 is further structured to implement commands through domain dependent support or service routines 204 and general support routines 206. As indicated by block 208, the state of the active machine (X or Y) is set either to STEP instructions or to RUN instructions in the code being executed.

Various debugger support routines 210 are housed in the simulator 104 and accessed through the control of the environment manager 102. Thus, address domain routine 212 and a cross-domain pre-check routine 214 are accessed in the environment manager 102 to provide additional support for debugger operation.

The address domain routine 212 determines whether an instruction address lies within the Y domain or the X domain as needed for simulator/debugging operations.

The cross-domain pre-check routine 214 (FIG. 9) enables the debugger 200 to determine whether the instruction about to execute (current program counter) will cause a change of code execution domain from X to Y or Y to X.

The simulator/debugger driver loop 112 (FIG. 4) is executed by the environment manager 102 to provide basic control over execution of Y code and for invoking the operation of the debugger for Y domain debugging as required. The memory system 14 contains the X and Y program codes 218 and 220 being executed by the native (X) architecture and the simulated (Y) architecture. Other memory contents related to debugger operations includes a Y domain address list 213, the breakpoint tables 217 used by the simulator 104 and by the debugger 110, and the state 219 of the Y architecture program (i.e., the context block or register state of the simulated processor).

In the present embodiment of the invention, a program counter is provided for each domain. Specifically, an X program counter and a Y program counter are provided, and the X and Y program counters are essentially independent of each other. The X program counter is a register that contains the address of the next instruction as fetched by X hardware from the memory instruction list of the X code. The Y program counter is a register in the X hardware structured to be part of the Y simulator and it similarly contains the next Y instruction as fetched by the simulator from the memory instruction list of the Y code.

Various modifications and variations can be made in the improved system and method for executing multiple codes multi-architecture environment with code debugging capability of the present invention by those skilled in the pertaining art without departing from the scope and spirit of the invention. It is accordingly intended that the present invention embrace such modifications and variations to the extent they come within the scope of the appended claims and their equivalents.

What is claimed is:

1. A method for creating a mixed code program for execution in a multiple code execution system that provides a multi-architecture environment including a real X architecture and a simulated Y architecture, an input X code provided with a plurality of X code modules having plurality of X routines; an input Y code provided with a plurality of Y code modules having a plurality of Y routines, said method comprising the steps of:

preparing a plurality of jacket descriptions defining calling conventions for incoming and outgoing calls for each said X routine in an X code module and for each said Y routine in a Y code module to be executed by said multiple code execution system, said calling conventions defining cross-domain interfacing between said X and Y routines, said jacket descriptions including identifications of call type, of a plurality of parameters usable in said calls, of a call result memory location for containing call results, and of a routine memory location for containing information to be preserved during said calls;

compiling a plurality of X jacket objects and a plurality of Y jacket objects from said jacket descriptions, each of said jacket objects including a jacket table embodying the corresponding jacket descriptions for said routines;

compiling a plurality of X objects from said X code module and a plurality of Y objects from said Y code module;

linking said X objects and said X jacket objects to produce an X image, said X image including code utilizing said cross-domain interfacing for enabling interactive multiple code execution and debugging;

linking said Y objects and said Y jacket objects to produce a Y image; and activating said X and Y images for interactive execution as said mixed code program in said execution system.

2. The method in accordance with claim 1, further comprising the steps of:

compiling a plurality of X objects from code for an environment manager component included in said multiple code execution system;

linking said X environment manager objects with said X objects and said X jacket objects in said X image;

generating an X image for a debugger component included in said multiple code execution system;

generating an X image for a simulator component included in said multiple code execution system;

activating said Y image and said X image and said debugger component image and said simulator component image for interactive execution of said X and Y modules under control of said environment manager, debugger and simulator components in said multi-architecture environment.

3. The method in accordance with claim 2, wherein said multiple code execution system includes an X computer system and said method further comprises:

operating said simulator component to simulate said Y architecture on said X computer;

operating said debugger component to debug said X code and said Y code in said multi-architecture environment; and managing operation of said simulating and debugging components and said X computer system to provide mixed X and Y code execution and debugging.

4. The method in accordance with claim 1, wherein said X and Y modules comprise related parts of an application program at a user level.

5. A system for executing multiple codes interactively in a multi-architecture environment including a real X architecture (domain) for executing X code and at least one additional simulated architecture (domain) for executing Y code, said multiple code executing system further comprising:

an X computer system having said X architecture embodied therein for executing X code including a plurality of X routines;

a memory coupled with said X computer system having stored X code and Y code;

means, included in said X computer system, for simulating said Y architecture on said X computer system to execute Y code including a plurality of Y routines; and means coupled with said X computer system for managing operation of said simulating means and said X computer system to provide interactive execution and debugging of said X code and Y code by switching execution between said X code and Y code in response to a plurality of cross-domain calls between said X code and said Y code from a calling routine to a called routine thereof; said X and Y domains having respective X and Y calling conventions;

means coupled with said X computer system for detecting said cross-domain calls;

means coupled with said detecting means and said managing means for jacketing said cross-domain calls to provide an interface between said calling conventions of said calling and called routines in said domains; said jacketing means includes jacketing tables having interface descriptive data for each said X and Y routine comprising a called or calling routine, and means for referencing said tables to set up a plurality of parameters for processing by said jacketing means.

6. The system in accordance with claim 5, wherein said interface descriptive data of said jacketing tables include identifications of call type, of parameters usable in said calls, of a call result memory location for containing call results, and of a routine memory location for containing information to be preserved during said calls.

7. The system in accordance with claim 5, wherein said referencing means references said jacketing tables for determining a memory location in said X domain from which parameters can be retrieved and for determining a memory location in said Y domain from which corresponding parameters can be placed.

8. The system in accordance with claim 5, wherein said X and Y routines include user level, application level code and comprise related portions of an application program.

9. The system in accordance with claim 5, wherein said X routines include at least one library routine.

10. The system in accordance with claim 5, wherein said managing means includes means for calling said simulating means to execute each jacketed call.

11. The system in accordance with claim 5, further comprising means for debugging said X code and said Y code during execution thereof, and wherein said debugging means includes means for generating a RUN or STEP mode signal, and said managing means further includes means for operating said simulating means in accordance with said RUN or STEP mode signal.

12. A system for executing multiple codes interactively in a multi-architecture environment including a real X architecture comprising an X domain for executing X code and at least one additional simulated architecture comprising a Y domain for executing Y code, said X and Y domains having respective X and Y calling conventions, said multiple codes executing system further comprising:

an X computer system having said X architecture embodied therein including a processor for executing X code including a plurality of X routines;

means, included in said X computer system, for simulating said Y architecture on said X computer system to execute Y code including a plurality of Y routines; and means coupled with said X computer system for managing operation of said simulating means and said X computer system to provide execution of said X code and Y code, said managing means switching execution between said X code and Y code in response to a plurality of cross-domain calls, each said cross-domain call being made from a calling routine in a first of said domains to a called routine in the other of said domains, each of said calling and called routines comprising one of said X and Y routines;

means coupled with said X computer system for detecting said cross-domain calls;

means coupled with said managing means and responsive to said detecting means for jacketing said cross-domain calls to provide an interface between said calling conventions of said calling and called routines in said domains; said jacketing means includes jacketing tables having interface descriptive data for said X and Y codes, and means for referencing said tables to set up a plurality of parameters for processing by said jacketing means.

13. The system in accordance with claim 12, wherein said interface descriptive data of said jacketing tables include identifications of call type, of parameters usable in said calls, of a call result memory location for containing call results, and of a routine memory location for containing information to be preserved during said calls.

14. The system in accordance with claim 12, wherein said referencing means references said jacketing tables for determining a memory location in said X domain from which parameters can be retrieved and for determining a memory location in said Y domain from which corresponding parameters can be placed.

15. The system in accordance with claim 12, wherein said X and Y routines include user level, application level code and comprise related portions of an application program.

16. The system in accordance with claim 12, wherein said X routines include at least one library routine called by said Y routines.

17. The system in accordance with claim 12, wherein said managing means includes means for calling said simulating means to execute each jacketed call.

18. The system in accordance with claim 12, further comprising means responsive to said managing means and included in said X computer system for debugging said X code and said Y code during execution thereof, and wherein said debugging means includes means for generating a RUN or STEP mode signal, and said managing means further includes means for operating said processor and said simulating means in accordance with said RUN or STEP mode signal.

* * * * *